(12) United States Patent
Barfoot et al.

(10) Patent No.: US 9,500,756 B2
(45) Date of Patent: Nov. 22, 2016

(54) GEO-LOCATING POSITIONS ALONG OPTICAL WAVEGUIDES

(71) Applicant: Halliburton Energy Services, Inc., Houston, TX (US)

(72) Inventors: David Andrew Barfoot, Houston, TX (US); Paul H. McPhail, Austin, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/042,970

(22) Filed: Feb. 12, 2016

(65) Prior Publication Data

US 2016/0161633 A1 Jun. 9, 2016

Related U.S. Application Data

(62) Division of application No. 14/049,330, filed on Oct. 9, 2013, now Pat. No. 9,316,762.

(51) Int. Cl.
*G01V 8/24* (2006.01)
*G01V 1/00* (2006.01)
(Continued)

(52) U.S. Cl.
CPC ........... *G01V 1/001* (2013.01); *G01D 5/35338* (2013.01); *G01V 8/16* (2013.01); *G01V 8/24* (2013.01)

(58) Field of Classification Search
CPC .................................. G01V 8/16; G01V 8/24
USPC .................................... 385/12, 13; 356/73.1
See application file for complete search history.

(56) References Cited

U.S. PATENT DOCUMENTS

| 5,146,358 A | 9/1992 | Brooks |
| 5,194,847 A | 3/1993 | Taylor et al. |
| 6,157,896 A | 12/2000 | Castles et al. |

(Continued)

FOREIGN PATENT DOCUMENTS

| GB | 2170594 A | 8/1986 |
| GB | 2442745 A | 4/2008 |

(Continued)

OTHER PUBLICATIONS

U.S. Appl. No. 14/049,330, Non Final Office Action mailed Jun. 24, 2015, 10 pgs.

(Continued)

*Primary Examiner* — Daniel Petkovsek
(74) *Attorney, Agent, or Firm* — Schwegman Lundberg & Woessner, P.A.; John W. Wustenberg

(57) ABSTRACT

A method of correlating physical locations with respective positions along an optical waveguide can include transmitting to the waveguide a signal including an indication of the transmitting location, and the waveguide receiving the signal. A system for correlating a physical location with a position along an optical waveguide can include a transmitter which transmits to the optical waveguide a signal including an indication of the transmitter location, and a computer which correlates the location to the position, based on the signal as received by the waveguide. A method of determining a position along an optical waveguide at which a signal is transmitted can include modulating on the signal an indication of a transmission location, and transmitting the signal to the waveguide, thereby causing vibration of the waveguide.

7 Claims, 3 Drawing Sheets

(51) Int. Cl.
*G01D 5/353* (2006.01)
*G01V 8/16* (2006.01)

(56) References Cited

U.S. PATENT DOCUMENTS

| | | |
|---|---|---|
| 7,274,441 B2 | 9/2007 | Payton |
| 7,606,592 B2 | 10/2009 | Becker |
| 7,848,645 B2 | 12/2010 | Healey et al. |
| 7,859,654 B2 | 12/2010 | Hartog |
| 8,095,003 B2 | 1/2012 | Peterson, Jr. |
| 8,131,121 B2 | 3/2012 | Huffman |
| 8,400,620 B2 | 3/2013 | Froggatt et al. |
| 9,316,762 B2 | 4/2016 | Barfoot et al. |
| 2005/0176443 A1 | 8/2005 | Halsey |
| 2008/0151231 A1 | 6/2008 | Peterson, Jr. |
| 2008/0219660 A1 | 9/2008 | Healey et al. |
| 2012/0162639 A1 | 6/2012 | Farhadiroushan et al. |
| 2015/0098673 A1 | 4/2015 | Barfoot et al. |
| 2016/0161632 A1 | 6/2016 | Barfoot et al. |

FOREIGN PATENT DOCUMENTS

| | | |
|---|---|---|
| GB | 2013114128 A1 | 8/2012 |
| WO | WO-2005095917 A2 | 10/2005 |
| WO | WO-2009011766 A1 | 1/2009 |
| WO | WO-2012010821 A2 | 1/2012 |
| WO | WO-2012018460 A2 | 2/2012 |
| WO | WO-2015053858 A1 | 6/2015 |

OTHER PUBLICATIONS

U.S. Appl. No. 14/049,330, Notice of Allowance mailed Dec. 11, 2015, 12 pgs.
U.S. Appl. No. 14/049,330, Response filed May 4, 2015 to Restriction Requirement mailed Apr. 16, 2015, 2 pgs.
U.S. Appl. No. 14/049,330, Response filed Sep. 24, 2015 to Non Final Office Action mailed Jun. 24, 2015, 8 pgs.
U.S. Appl. No. 14/049,330, Restriction Requirement mailed Apr. 16, 2015, 9 pgs.
International Application Serial No. PCT/US2014.051417, International Search Report and Written Opinion mailed Nov. 24, 2014.
International Application Serial No. PCT/US2014/051417, International Search Report mailed Nov. 24, 2014, 3 pgs.
International Application Serial No. PCT/US2014/051417, Written Opinion mailed Nov. 24, 2014, 6 pgs.
Dakin, J. P. et al., "Distributed Optical Fibre Raman Temperature Sensor Using a Semiconducted Light Source and Detector", Electronics Letters, vol. 21, No. 13, (Jun. 1985), 569-570.
Sklar, Bernard, "Chapter 4—Bandpass Modulation and Demodulation", In: Digital Communications: Fundamentals and Applications, Second Edition, Prentice Hall PTR, Upper Saddle River, New Jersey, (Feb. 2013), 167-241.
Sklar, Bernard, "Digital Communications: Fundamentals and Applications", Second Edition, Prentice Hall PTR, Upper Saddle River, New Jersey, (Feb. 2013), 167-237.
Udd, Eric, et al., "Chapter 11—Distributed and Multiplexed Fiber Optic Sensors", In: Fiber Optic Sensors: An Introduction for Engineers and Scientists, Second Edition, John Wiley & Sons, Inc., Hoboken, New Jersey, (2011), 277-314.
Ukil, Abhisek, et al., "Distributed Temperature Sensing: Review of Technology and Applications", IEEE Sensors Journal, vol. 12, No. 5, (May 2012), 885-892.
Xiao, Shang-Hui, et al., "Fibre-Optic Distributed Sensing Techniques Employing Brillouin Scattering", ICSP2008 Proceedings, (2008), 2612-2615.
U.S. Appl. No. 15/042,869, Non Final Office Action mailed Mar. 29, 2016, 9 pgs.
U.S. Appl. No. 15/042,869, Response filed Jun. 28, 2016 to Non Final Office Action mailed Mar. 29, 2016, 5 pgs.
International Application Serial No. PCT/US2014/051417, International Preliminary Report on Patentability mailed Apr. 21, 2016, 8 pgs.

GEO-LOCATING POSITIONS ALONG OPTICAL WAVEGUIDES

RELATED APPLICATION

This application is a divisional application of U.S. application Ser. No. 14/049,330, filed on Oct. 9, 2013; which application is incorporated herein by reference in its entirety.

BACKGROUND

This disclosure relates generally to equipment utilized and operations performed in conjuction with optical sensors and, in an example described below, more particularly provides for geo-locating positions along optical waveguides.

An optical waveguide can be used for sensing one or more parameters (such as, temperature, pressure, vibration, chemistry, pH, etc.) as distributed along the waveguide. However, it can be difficult to correlate a distance or position along the waveguide with a physical location of the sensed property.

Therefore, it will be appreciated that improvements are continually needed in the art of sensing parameters with optical waveguides. These improvements can be useful whether or not a property is sensed as distributed along the waveguide, or the property is sensed at one or more discreet positions along the waveguide.

DETAILED DESCRIPTION

Figure 1:
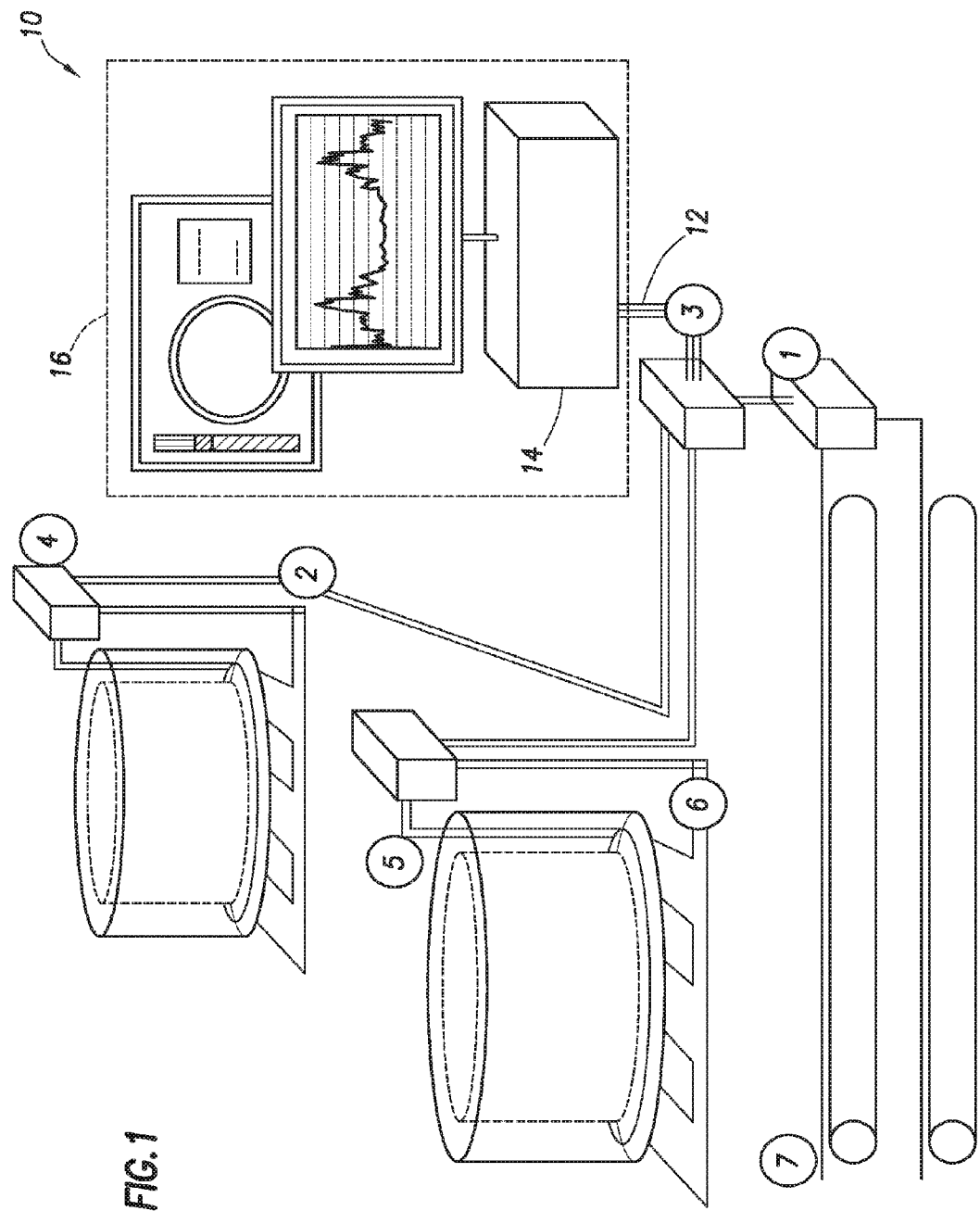
FIG. 1 is a representative schematic view of a system and associated method which can embody principles of this disclosure.

Representatively illustrated in FIG. 1 is a system 10 and associated method which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

Fiber optic sensing using distributed (or quasi-distributed) multiplexed sensors has been employed for monitoring a variety of physical structures, including power cables, pipelines, bridges, dams, liquefied natural gas plants, chemical plants, mine shafts and oil wells, for example. Parameters such as temperature, pressure, deformation, vibration, acoustics, pH, chemical concentration and others have been measured using distributed fiber optic sensors and multiplexed fiber optic point sensors.

A well-known technique, known as distributed temperature sensing (DTS), optically interrogates the fiber (or other optical waveguide) in such a way that the fiber effectively becomes an array of temperature sensors distributed along the fiber at 1 meter or less increments. The DTS technique uses a laser and a modulator to modulate (with pulse, coded, frequency, etc., modulation) light that is sent into the fiber optic cable.

Distance along the fiber is related to either a time delay after pulsing the laser, with the distance calculated from a speed of light in the fiber for optical time-domain multiplexing (TDM), or a frequency band obtained after a digital signal processing system converts a time-domain photo-receiver signal to frequency domain for optical frequency domain multiplexing (FDM). Measurement of other parameters (such as, vibration, pressure and chemical concentration) is possible using detection of Raman scattering, Brillioun scattering (including stimulated Brillioun scattering), or Rayleigh scattering (including coherent or "phase" Rayleigh scattering).

Currently, when deploying a distributed fiber optic sensor over long distances (e.g., hundreds of meters or more) or on large structures (bridges, chemical plants, etc.), there is a laborious and error-prone part of the installation that involves spatially calibrating or mapping the sensing fiber to specific physical locations being monitored. The fiber sensing locations as measured by a fiber interrogator are typically based on respective lengths along the fiber, and distances are calculated using the speed of light in the fiber.

However, even when monitoring is performed along a relatively straight path (such as, in pipeline monitoring), the fiber optic cable is not perfectly straight. Usually, the fiber is contained in a protective cable structure that may consist of a metal tube and other protective layers. The fiber may not be perfectly straight in such a tube.

Additionally, to allow the cable to bend and stretch due to thermal expansion of the metals and strain experienced in use, there is usually an "over-stuff" factor applied, whereby for every N meters of cable length, there are N+1 meters of fiber within the cable. The "over-stuff" factor may not be precisely controlled during manufacturing of the cable, and so an exact length of the fiber corresponding to a certain length of the cable may not be precisely known.

In the FIG. 1 example, a liquefied natural gas plant is being monitored with a fiber optic cable 12 using DTS. In order to map locations of the fiber within the plant, it is desired to correlate each physical location or point of interest (labeled in FIG. 1 as locations 1-7) with an exact distance along the fiber. This distance along the fiber will be associated with a specific time of flight of light from an interrogator 14 along the fiber to the point of interest and back to the interrogator.

It would be beneficial to use a mapping method that requires only a single person, that can be performed very quickly, and that can be completed without having to be in very close proximity with the fiber at each point of interest. This latter preference is due to the fact that the fiber may be in an elevated or otherwise out of reach location, in a structure (such as, in a wall, in concrete or earth, etc.), in a hazardous location, or otherwise not conveniently accessible. Of course, the scope of this disclosure is not limited to performance of a method by only a single person, performance of the method during any particular time period or use with optical fibers in inaccessible locations.

This disclosure provides to the art an efficient method to geo-locate or spatially correlate a distance along an optical waveguide (such as, an optical fiber, an optical ribbon, etc.) with a Global Positioning System (GPS) coordinate, latitude and longitude, or named or otherwise identified location. This method will be useful with deployments of distributed optical sensors, for example, distributed temperature sensing (DTS), distributed strain sensing (DSS), distributed acoustic sensing (DAS), distributed vibration sensing (DVS), distributed pressure sensing (DPS), distributed chemical sensing (DCS) or any distributed sensing technique using an optical waveguide.

These distributed sensing techniques are well-known to those skilled in the art, and so detailed explanations of how each technique is performed are not provided here. However, it will be understood by those skilled in the art that such distributed sensing techniques include detection of variations in optical scattering in an optical waveguide to indicate a parameter as distributed along the waveguide. For example, the scattering may include Raman, Rayleigh or Brillouin scattering.

Additionally, where a quasi-distributed array of optical sensors is deployed (for example, an array of fiber Bragg gratings, or Fabry-Perot cavities spliced linearly onto a fiber optic line), this method may be used by putting a standard, unmodified single-mode fiber inside a same cable where the multi-point/quasi-distributed sensors are located. Examples include arrays of optical geophones, tiltmeters, temperature sensors, etc.

A method provided by this disclosure can include using a distributed acoustic sensor interrogation technique to sense an acoustic telemetry signal containing GPS coordinates or other indication of physical location transmitted to the fiber via an acoustic or vibration source. A device (such as a mobile phone) can be configured to include a GPS receiver or another way of indicating physical location, a modulator (implemented, for example, with computer instructions) for modulating the physical location indication on a signal, and a transmitter for transmitting the signal to the fiber.

A DAS or DVS interrogator 14 can detect the encoded transmission and assign a distance along the fiber where the transmission was received to a corresponding physical location, thus geo-locating the fiber optic cable 12. This method is envisioned to be used during a commissioning process for any distributed or quasi-distributed fiber optic sensor(s) for geo-locating the fiber, to thereby build an accurate map of fiber locations versus sensing channels/points.

The method provided by this disclosure can use a distributed acoustic sensor interrogation method (such as, any interrogation method based on coherent Rayleigh fiber interrogation) to sense an acoustic telemetry signal transmitted to the fiber via an acoustic or vibration source. This information is used to create a mapping of distances along the fiber to points of interest or GPS coordinates.

The fiber may have been installed as a sensor to sense another parameter of interest. However, during the mapping process, a DAS interrogator can be connected to the fiber. After the mapping process is completed, the original fiber sensor interrogator may be reconnected to the fiber. In some cases, the DAS may be both a temporary telemetry interrogator and a long term sensing interrogator, or the interrogator may combine capabilities of DAS with other sensing methods in a same interrogation system.

In one example, an operator may carry a portable, battery powered, hand-held device containing a Global Positioning System (GPS) satellite receiver, a microprocessor, a speaker and/or vibrator, and a software application designed to modulate the GPS coordinates as acoustic information via the speaker or vibrator to the fiber. For example, the device may be a smart phone equipped with a mobile software application that automatically performs these functions at the push of a button. A specialized software application can be installed on the device that, when directed by an operator, will read the GPS coordinates from the GPS receiver, calculate an acoustic waveform to transmit the location information (e.g., including latitude, longitude and altitude) obtained from the GPS receiver, and transmit the waveform via the speaker or vibrator.

The calculated waveform may result from any suitable modulation scheme for encoding digital information. This scheme may include using a carrier frequency and encoding digital information as a series of phase shifts as in phase shift keying (PSK, DPSK, etc.), or frequency shifting (FSK), amplitude shifting (ASK), pulse code modulation (PCM), etc.

The encoded information may also include information to validate the transmission (such as, a checksum or cyclic redundancy check (CRC)), and/or may use error-correcting codes to improve reliability. Any method of encoding digital information into acoustic or vibration energy that may be decoded by a receiver can be used.

The physical location information may be provided by GPS satellites or any other navigation system, including Galileo, Compass, Global Navigation Satellite System (GLONASS), triangulation from cellular phone system towers, radio frequency (RF) transmitters, etc. The scope of this disclosure is not limited to any particular source of physical location information.

At a control room 16 where the DAS interrogator 14 is located, the fiber is monitored for encoded acoustic information (for example, using suitable software designed to detect received modulated signals). When a valid acoustic transmission is detected and successfully decoded, the software can store the physical location information (e.g., navigation coordinates or text message), along with a distance along the fiber at which the transmission was received by the fiber. If the transmission was detected at multiple distances along the fiber, the software may use the distance along the fiber where the signal was the strongest. In some cases, a more accurate position may be provided by using beam-forming techniques, for example, in cases where the transmission originated some distance away from the fiber.

The software application on the mobile device may allow an operator to enter a text message with the physical location information in the form of a descriptor (for example, "PIPELINE JUNCTION 123" or "TANK B DRAIN"). When the operator initiates the transmission, the application will encode the text message as an acoustic or vibration waveform sent to a transmitter using a modulation scheme as described above. This can be useful, for example, when the physical location is in an area in which GPS or other navigation signals cannot be received (such as, in an underground tunnel).

In some scenarios, the fiber optic cable may be behind a wall or underground and, therefore, an acoustic signal from a low-power speaker (such as, those typically found in a mobile phone) would be attenuated to a level that may not be received successfully by the fiber. In these cases, it may be advantageous for the operator to also carry a portable battery powered vibrator, voice coil, loud speaker or megaphone, etc. The vibrator or speaker could be plugged into a headphone jack of the mobile phone, and could provide a highly amplified acoustic or vibration signal that would be successfully received by the fiber.

If the mobile device has a capability to receive messages, as in the case of a mobile phone, and is connected with good reception to a cellular or wireless network, the DAS software may send a text message or use any other wireless messaging technique (e.g., e-mail, etc.), to send a confirmation message back to the operator as confirmation that the transmission was received. If the operator does not receive a confirmation, the signal may be re-transmitted, perhaps at a slightly different location, or with a different frequency or encoding method, in order to overcome the poor reception.

After storing the mapping of distances along the fiber to actual physical locations, the software may provide an on-screen visualization of a layout of the fiber spatially based on the location information received for the points of interest. In one example, text messages may be displayed as labels next to the positions along the fiber where they were transmitted.

Many other useful graphical representations of the information may be possible, including renderings in 2-D, 3-D, a tabulated list or spreadsheet, etc. This mapping information may also be stored on storage media in a file or database for later retrieval and processing.

Note that a correction factor may need to be applied to the distances along the fiber in the case where the interrogation method used in a sensing technique that the fiber is installed for (e.g., temperature sensing, strain sensing, etc.) uses a significantly different wavelength of light as compared to a wavelength of light used when receiving the physical location information with the fiber. This is because the effective refractive index of the fiber can be different at respective different wavelengths.

A convenient way to calculate the correction factor is to use an end of the fiber as a reference. For example, if in the case of DAS interrogation, the location where the return signal strength is zero (which is at the end of the fiber) may be at 1000 meters along the fiber. However, using another sensing method at a different wavelength, the end of the fiber may appear to be at 990 meters. By applying a correction factor of 990/1000 to the distances recorded during mapping, the correct distances for the longer term sensing technique will be recorded.

In another embodiment, the fiber optic cable may be deployed in a subterranean well borehole. By deploying a wireline or coiled tubing conveyed acoustic transmitter, the mapping process may be performed by modulating on the transmission the depth in the borehole, so that distances along the fiber may be mapped to corresponding borehole depths. Although a GPS signal is not available in a borehole, a typical wireline or coiled tubing deployment facility will include a depth encoder, casing collar locator or other method to determine borehole depth.

A method provided by this disclosure is beneficial, in that it provides an efficient and at least partially automated means of mapping actual physical locations to distances along a fiber optic cable 12. The fiber optic cable 12 may be installed for the purpose of sensing a parameter other than acoustics (for example, temperature, strain, pressure, etc.), but the fiber can temporarily be used as an acoustic sensor during the mapping process by connecting a distributed acoustic sensor interrogator 14 to the fiber while the mapping process is taking place. After the mapping process is completed, an interrogator for more long term use may be reconnected to the fiber. In one implementation, the interrogator 14 may support more than one interrogation method, including DAS, such that the fiber need not be connected to another interrogator at all.

The method is also beneficial because it allows for much more accurate mappings of the fiber cable to physical locations and points of interest. In addition, the method dramatically speeds up the mapping process.

The method provides for an unambiguous and efficient method of mapping GPS coordinates or other location information to distances along the fiber. GPS coordinates can be encoded as acoustic information and transmitted to the fiber itself. The transmission is detected and decoded in real-time using the interrogator 14 at one end of the fiber. Therefore, an unambiguous and immediate correlation between a distance along the fiber and a GPS coordinate (or other location information) is obtained and used to build a mapping of distances along the fiber to respective actual physical locations.

Figure 2:
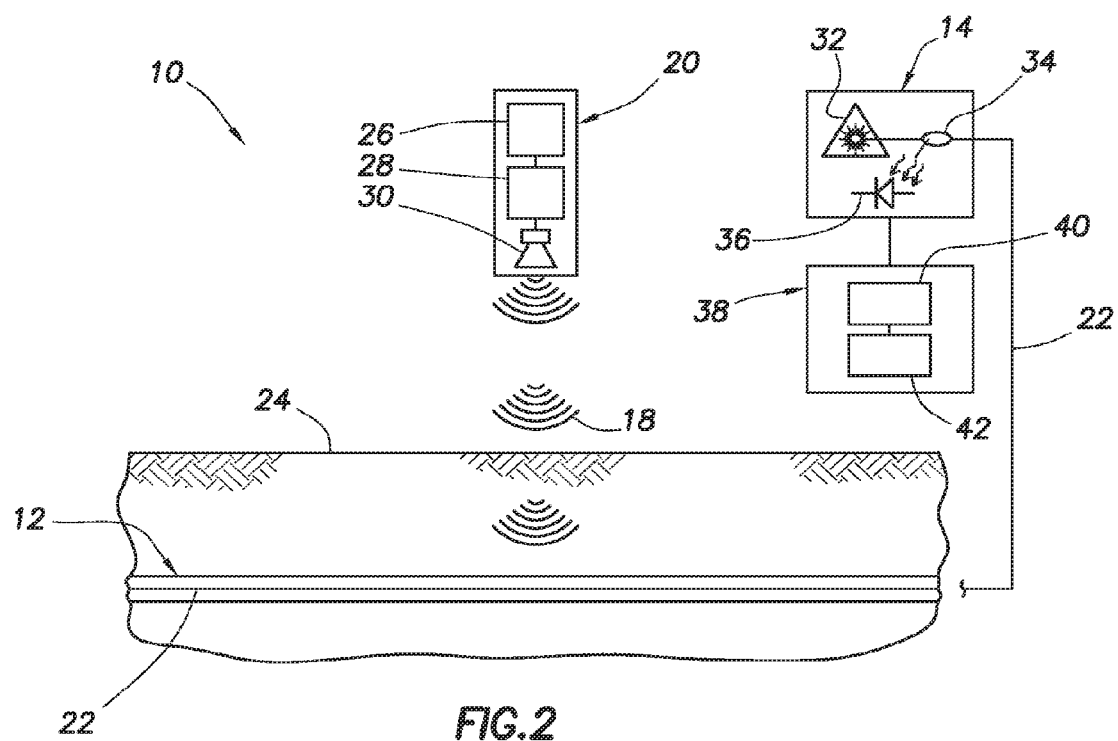
FIG. 2 is a representative partially cross-sectional view of the system and method, in which a signal is transmitted to an optical waveguide.

Referring additionally now to FIG. 2, a schematic view of the system 10 is representatively illustrated, in which a signal 18 is transmitted from a device 20 to an optical waveguide 22 of the fiber optic cable 12. In this example, the cable 12 is surrounded by or embedded in a structure 24 (such as, cement, a wall, earth, a pipeline, etc.), and the signal 18 is transmitted through the structure to the optical waveguide 22. The optical waveguide 22 may comprise a single mode or multi-mode waveguide, or any combination thereof.

One or more distributed optical sensing techniques may be used in the system 10. These techniques can include detection of Brillouin backscatter and/or coherent Rayleigh backscatter resulting from transmission of light through the optical waveguide 22. Raman backscatter may also be detected and, if used in conjunction with detection of Brillouin backscatter, may be used for thermally calibrating the Brillouin backscatter detection data in situations, for example, where accurate strain measurements are desired.

Optical sensing techniques can be used to detect static strain, dynamic strain, acoustic vibration and/or temperature. These optical sensing techniques may be combined with any other optical sensing techniques, such as hydrogen sensing, stress sensing, etc.

Stimulated Brillouin backscatter detection can be used to monitor acoustic energy along the optical waveguide 22. Coherent Rayleigh backscatter can be detected as an indication of vibration of the optical waveguide 22.

The optical waveguide 22 could include one or more waveguides for Brillouin backscatter detection, depending on the Brillouin method used (e.g., linear spontaneous or non-linear stimulated). The Brillouin backscattering detection technique measures the natural acoustic velocity. via corresponding scattered photon frequency shift in the waveguide 22 at a given location along the waveguide.

Coherent Rayleigh backscatter can be used to monitor dynamic strain (e.g., acoustic pressure and vibration). Coherent Rayleigh backscatter detection techniques can detect acoustic signals which result in vibration of the optical waveguide 22.

Raman backscatter detection techniques are preferably used for monitoring distributed temperature. Such techniques are known to those skilled in the art as distributed temperature sensing (DTS).

Raman backscatter is relatively insensitive to distributed strain, although localized bending in a waveguide can be detected. Temperature measurements obtained using Raman backscatter detection techniques can, for example, be used for temperature calibration of Brillouin backscatter measurements.

Raman light scattering is caused by thermally influenced molecular vibrations. Consequently, the backscattered light carries the local temperature information at the point where the scattering occurred.

The amplitude of an Anti-Stokes component is strongly temperature dependent, whereas the amplitude of a Stokes component of the backscattered light is not Raman backscatter sensing requires some optical-domain filtering to isolate the relevant optical frequency (or optical wavelength) components, and is based on the recording and computation of the ratio between Anti-Stokes and Stokes amplitude, which contains the temperature information.

Since the magnitude of the spontaneous Raman backscattered light is quite low (e.g., 10 dB less than Brillouin backscattering), high numerical aperture (high NA) multi-mode optical waveguides are typically used, in order to maximize the guided intensity of the backscattered light. However, the relatively high attenuation characteristics of highly doped, high NA, graded index multi-mode waveguides, in particular, limit the range of Raman-based systems to approximately 10 km.

Brillouin light scattering occurs as a result of interaction between a propagating optical signal and thermally excited acoustic waves (e.g., within the GHz range) present in silica optical material. This gives rise to frequency shifted components in the optical domain, and can be seen as the diffraction of light on a dynamic in situ "virtual" optical grating generated by an acoustic wave within the optical media. Note that an acoustic wave is actually a pressure wave which introduces a modulation of the index of refraction via an elasto-optic effect.

The diffracted light experiences a Doppler shift, since the grating propagates at the acoustic velocity in the optical media. The acoustic velocity is directly related to the silica media density, which is temperature and strain dependent. As a result, the so-called Brillouin frequency shift carries with it information about the local temperature and strain of the optical media.

Note that Raman and Brillouin scattering effects are associated with different dynamic non-homogeneities in silica optical media and, therefore, have completely different spectral characteristics.

Coherent Rayleigh light scattering is also caused by fluctuations or non-homogeneities in silica optical media density, but this form of scattering is purely "elastic." In contrast, both Raman and Brillouin scattering effects are "inelastic," in that "new" light or photons are generated from the propagation of the laser probe light through the media.

In the case of coherent Rayleigh light scattering, temperature or strain changes are identical to an optical source (e.g., very coherent laser) wavelength change. Unlike conventional Rayleigh backscatter detection techniques (using common optical time domain reflectometers), because of the extremely narrow spectral width of the laser source (with associated long coherence length and time), coherent Rayleigh (or phase Rayleigh) backscatter signals experience optical phase sensitivity resulting from coherent addition of amplitudes of the light backscattered from different parts of the optical media which arrive simultaneously at a photo-detector.

The device 20 in the FIG. 2 example includes a navigational receiver 26. The receiver 26 is used to determine a physical location of the device 20 just prior to, or during, the transmission of the signal 18. For example, the receiver 26 may comprise a GPS, GLONASS, Compass, Galileo, cellular, RF or other type of receiver capable of receiving location information or otherwise capable of determining the actual physical location of the device 20.

In other examples, the location information may be entered to the device in descriptive form. A text descriptor (for example, describing the actual physical location of the device 20) could be input to the device by an operator, in which case the receiver 26 could be replaced by a keyboard, touchpad or other type of input device. Thus, the scope of this disclosure is not limited to any particular way of inputting or receiving location information to or at the device 20.

The device 20 of FIG. 2 also includes a modulator 28. The modulator 28 modulates the location information on the signal 18 to be transmitted via a transmitter 30. The modulator 28 may use any suitable modulating or encoding technique, such as, phase shift keying, frequency shift keying, amplitude shift keying, etc., as discussed above. The modulator 28 may be implemented as a software application installed in memory (not shown) of the device 20, as firmware, or in any other suitable form. Thus, the scope of this disclosure is not limited to any particular type or form of modulator.

The transmitter 30 is depicted in FIG. 2 as being a speaker or other type of acoustic emitter in the device 20. However, in other examples, the transmitter 30 could be external to the device 20, and the transmitter could transmit the signal 18 at frequencies outside of an "acoustic" range. Therefore, it will, be appreciated that the scope of this disclosure is not limited to use of any particular type of transmitter or signal transmission.

In the FIG. 2 example, the waveguide 22 is connected to the interrogator 14 (such as, in the control room 16, see FIG. 1), which includes an optical source 32 (such as, a laser or light emitting diode), a coupler 34 and a photo-detector 36 (such as, a photodiode). In this example, the optical source 32 launches a light pulse into the optical waveguide 22, and scattered light is returned to the photo-detector 36 via the coupler 34.

Of course, the interrogator 14 is only schematically depicted in FIG. 2 and, in actual practice, the interrogator can include additional components (such as, an interferometer, an optical time domain reflectometer, etc.), more sophisticated components, alternate components, etc. Thus, the scope of this disclosure is not limited to use of any particular type or configuration of interrogator.

An output of the photo-detector 36, representative of the detected scattered light, is received by a computer 38. In some examples, the computer 38 and interrogator 14 could be combined into a single instrument, and/or other components (such as, displays, input devices, communication facilities, etc.) may be provided. The computer 38 may be used to control operation of the interrogator 14 (for example, to control an output of the optical source 32).

The computer 38 in this example includes at least a processor 40 and memory 42. The output of the photo-detector 36 can be recorded in the memory 42 and/or on other storage media (such as, removable disks, tapes, external drives, solid state memory, etc.).

A portion of the memory 42 can store a software application for demodulating the signal 18 as received by the optical waveguide 22 and represented in the output of the photo-detector 36. In this example, the software application can cause the processor 40 to manipulate the photo-detector 36 output stored in the memory 42, so that the signal 18 and the distance along the waveguide 22 at which the signal was received is determined. Further, the signal 18 can be demodulated, so that the physical location information modulated on the signal is known and can be associated with the distance along the waveguide 22.

If the signal 18 causes acoustic vibration of the optical waveguide 22, then DAS techniques well known to those skilled in the art can be utilized to determine a position along the waveguide at which the signal is received by the waveguide. For example, stimulated Brillouin or coherent Rayleigh scatter detection can be used to sense acoustic vibration of the waveguide 22.

The position along the waveguide 22 at which the signal 18 is received can be determined as the position at which the acoustic vibration has a greatest amplitude, or beam-forming techniques may be utilized, as discussed above. However, it should be understood that the scope of this disclosure is not limited to any particular way of determining the position at which the signal 18 is received by the waveguide 22, or to any particular way of detecting the signal with the waveguide (for example, distributed or quasi-distributed optical sensing techniques could be utilized).

Figure 3:
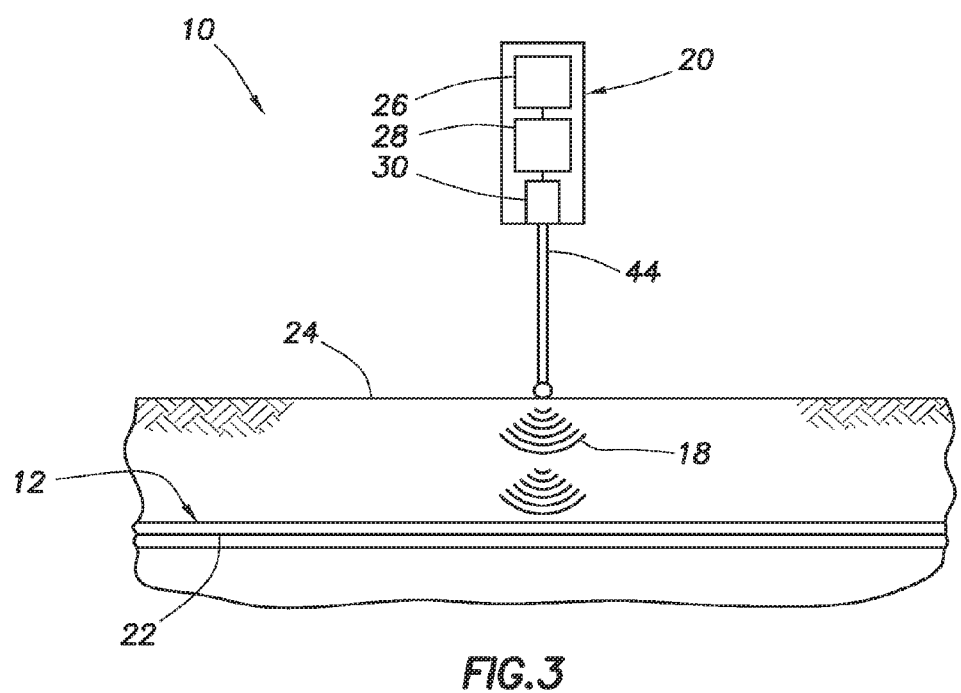
FIG. 3 is a representative partially cross-sectional view of another example of the system and method.

Referring additionally now to FIG. 3, another example of the system 10 and associated method are representatively illustrated. In this example, the transmitter 30 is in the form of a vibratory emitter, with an extension 44 that contacts the structure 24.

The transmitter 30 (via the extension 44) transmits the signal 18 as vibrations through the structure 24 to the cable 12 and waveguide 22 therein. The vibrations may or may not be in the acoustic range.

If the vibrations are in the acoustic range, then. DAS techniques may be used as described above for receiving the signal 18 and determining a distance along the optical waveguide 22 at which the signal is received. If the vibrations are not in the acoustic range, then DVS techniques may be used for these purposes.

Although not shown in FIG. 3, the optical waveguide 22 can be connected to the interrogator 14 as depicted in FIG. 2. Note that it is not necessary for the signal 18 to be transmitted through the structure 24 to the optical waveguide 22, since (for example, if the cable 12 is readily accessible) the cable could be directly or indirectly vibrated using the transmitter 30.

Figure 4:
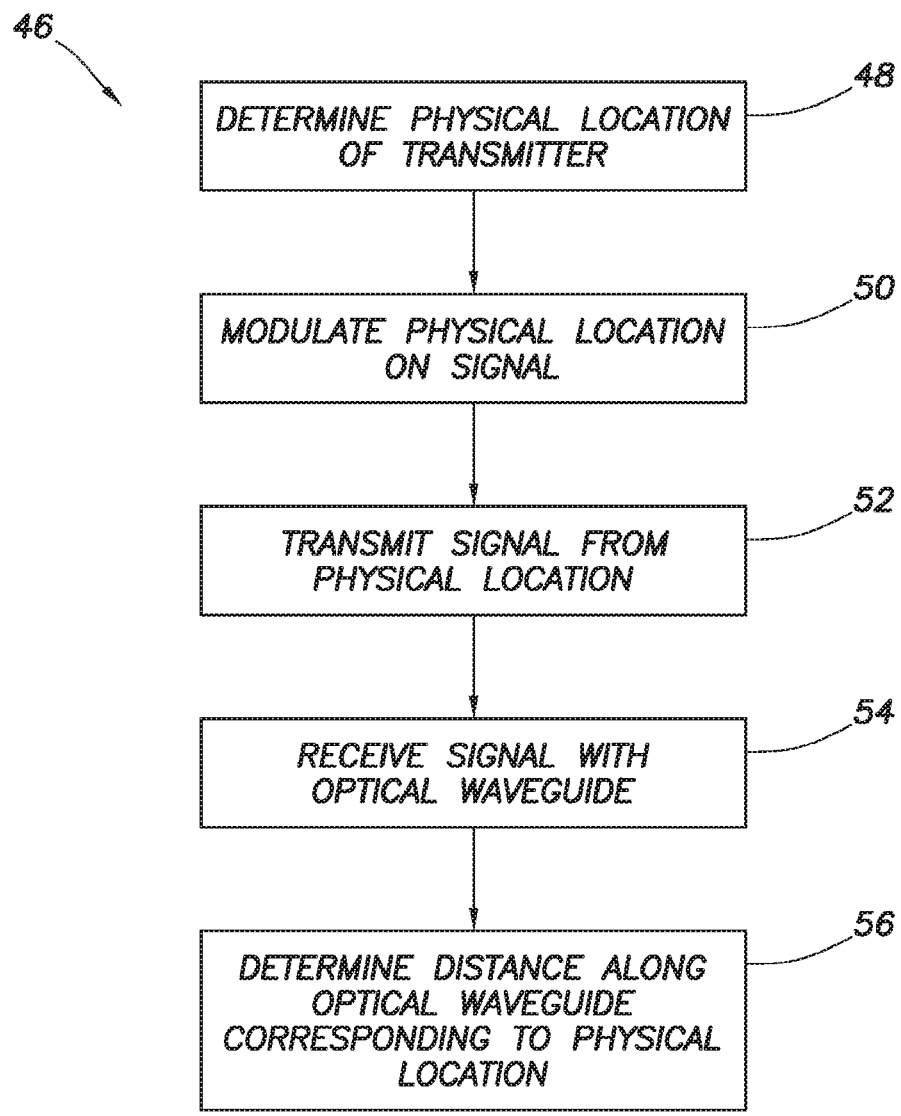
FIG. 4 is a representative flowchart for the method.

Referring additionally now to FIG. 4, a flowchart for the method 46 of correlating physical locations with respective positions along the optical waveguide 22 is representatively illustrated. The method 46 may be used with the system 10 described above, or the method may be used with other systems in keeping with the scope of this disclosure.

In the FIG. 4 example, the method 46 begins with a step 48 in which a physical location of the transmitter 30 is determined. As discussed above, the navigational receiver 26 may be used for this purpose. In some examples, an operator can enter a physical location descriptor, such as, a text message, a numerical indicator, etc.

In step 50, the physical location information is modulated on a signal 18. The modulator 28 described above may be used for this purpose. Any suitable modulation technique may be used.

In step 52, the signal 18 is transmitted from the physical location. The transmitter 30 described above may be used for this purpose. Any form of transmission may be used, including but not limited to acoustic or other vibratory transmission.

In step 54, the signal 18 is received with the optical waveguide 22. In some examples, distributed optical sensing techniques (such as, those in which detection of optical scattering along the optical waveguide 22 is utilized) may be used to receive the signal 18. However, use of distributed optical sensing techniques is not necessary in keeping with the scope of this disclosure.

In step 56, a distance along the optical waveguide 22 corresponding to the physical location at which the signal 18 was transmitted is determined. This distance is associated with the physical location at which the signal 18 was transmitted.

It may now be fully appreciated that the above disclosure provides significant advancements to the art of sensing parameters with optical waveguides. In examples described above, various actual physical locations can be conveniently, accurately and efficiently correlated with respective distances along a waveguide 22, so that the optical sensing subsequently performed using the waveguide can be correctly associated with the locations at which the parameters are sensed.

A method 46 of correlating at least one physical location with at least one position along an optical waveguide 22 is provided to the art by the above disclosure. In one example, the method 46 can comprise: transmitting a signal 18 to the optical waveguide 22, the signal 18 including an indication of the physical location of the transmitting; and receiving the signal 18 with the optical waveguide 22.

The indication of the physical location may include a latitude and longitude of the physical location, and/or a descriptor of the physical location.

The transmitting step may comprise acoustically transmitting the signal 18. The transmitting step may comprise causing vibration of the optical waveguide 22.

The method 46 can include determining a distance along the optical waveguide 22 corresponding to the position at which the signal 18 is received.

The method 46 can include determining the position along the optical waveguide 22 closest to the transmitting.

Also described above is a system 10 for correlating at least one physical location with at least one position along an optical waveguide 22. In one example, the system 10 can include a transmitter 30 which transmits a signal 18 to the optical waveguide 22, the signal 18 including an indication of the physical location of the transmitter 30; and a computer 38 which correlates the physical location to the position along the optical waveguide 22, based on the signal 18 as received by the optical waveguide 22.

The transmitter 30 may comprise an acoustic emitter. The transmitter 30 may comprise a vibratory emitter.

The system 10 may include a navigational receiver 26 which determines the physical location of the transmitter 30. The system 10 may include a modulator 28 which modulates on the signal 18 the indication of the physical location.

The transmitter 30 may transmit the signal 18 through a structure 24 surrounding the optical waveguide 22.

Another example of the method 46 of determining a position along an optical waveguide 22 at which a signal 18 is transmitted can comprise: modulating on the signal 18 an indication of a physical location at which the signal 18 is transmitted; and transmitting the signal 18 to the optical waveguide 22, thereby causing vibration of the optical waveguide 22.

The method 46 can also include receiving the signal 18 as variations in optical scattering in the optical waveguide 22.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method comprising:
    modulating on a signal an indication of a physical location at which the signal is transmitted;
    transmitting the signal to an optical waveguide from exterior to the optical waveguide at a position along the optical waveguide from an input to the optical waveguide, thereby causing vibration of the optical waveguide; and
    determining the position along the optical waveguide at which the signal is transmitted by interaction of light injected at the input of the optical waveguide with the vibration of the optical waveguide caused by the modulated signal.

2. The method of claim 1, wherein the transmitting comprises acoustically transmitting the signal to the optical waveguide.

3. The method of claim 1, wherein the indication of the physical location includes a latitude and longitude of the physical location.

4. The method of claim 1; wherein the indication of the physical location includes a descriptor of the physical location.

5. The method of claim 1, further comprising determining a distance along the optical waveguide corresponding to the position at which the signal is received.

6. The method of claim 1, further comprising determining the position along the optical waveguide closest to the transmitting.

7. The method of claim 1, further comprising receiving the signal as variations in optical scattering in the optical waveguide.

* * * * *